(12) United States Patent
Maeda et al.

(10) Patent No.: US 8,043,072 B2
(45) Date of Patent: Oct. 25, 2011

(54) FILTER, PISTON PUMP USING THE FILTER, AND METHOD OF MOUNTING THE FILTER IN A VALVE SEAT MEMBER OF THE PISTON PUMP

(75) Inventors: Junichi Maeda, Kariya (JP); Tomoo Harada, Anjo (JP)

(73) Assignee: Advics Co., Ltd., Kariya, Aichi (JP)

( * ) Notice: Subject to any disclaimer, the term of this patent is extended or adjusted under 35 U.S.C. 154(b) by 1316 days.

(21) Appl. No.: 11/653,391

(22) Filed: Jan. 16, 2007

(65) Prior Publication Data

US 2007/0183911 A1 Aug. 9, 2007

(30) Foreign Application Priority Data

Feb. 7, 2006 (JP) .................................. 2006-029692

(51) Int. Cl.
*F04B 23/00* (2006.01)
*F04B 53/20* (2006.01)
(52) U.S. Cl. ........................ 417/313; 417/549; 417/569
(58) Field of Classification Search .................. 417/313, 417/470, 549, 554; 91/422
See application file for complete search history.

(56) References Cited

U.S. PATENT DOCUMENTS

| | | | |
|---|---|---|---|
| 5,345,204 A | 9/1994 | Okada et al. | |
| 5,836,350 A | 11/1998 | Sakaguchi et al. | |
| 6,866,489 B2 * | 3/2005 | Hinz et al. | 417/470 |
| 2003/0053920 A1 | 3/2003 | Hinz et al. | |

FOREIGN PATENT DOCUMENTS

| | | |
|---|---|---|
| JP | 48-62602 U | 8/1973 |
| JP | 5-226910 A | 9/1993 |
| JP | 6-30407 U | 4/1994 |
| JP | 9-42514 A | 2/1997 |
| JP | 2003-028339 A | 1/2003 |
| JP | 2003-528244 A | 9/2003 |
| JP | 2005-131137 A | 5/2005 |
| JP | 2005-274714 A | 10/2005 |

OTHER PUBLICATIONS

Official Action issued Jan. 8, 2010 by the State Intellectual Property Office of People's Republic of China, in corresponding CN Patent Application No. 2007100027856; and English-language translation thereof.
Office Action dated Nov. 30, 2010, issued by the Japanese Patent Office in corresponding Japanese Patent Application No. 2006-029692, and partial English language translation of the Office Action.

* cited by examiner

*Primary Examiner* — Charles Freay
(74) *Attorney, Agent, or Firm* — Buchanan Ingersoll & Rooney PC

(57) ABSTRACT

A filter to be mounted in a valve seat member for filtering liquid is proposed which can be manufactured without a drawing step, thereby improving productivity and cost performance of a piston pump in which such a filter is mounted. The filter is a flat metal plate including a main body formed with a plurality of filter holes in a central portion thereof, and a plurality of projections integrally and radially outwardly extending from a perimeter of the main body so as to be circumferentially spaced apart from each other. The filter is pushed into a filter mounting hole formed in a valve seat member of a discharge valve in a piston pump with the projections bent toward the opening of the filter mounting hole while being pressed against the inner surface of the filter mounting hole under an elastic restoring force and fixed to the valve seat member.

10 Claims, 4 Drawing Sheets

FILTER, PISTON PUMP USING THE FILTER, AND METHOD OF MOUNTING THE FILTER IN A VALVE SEAT MEMBER OF THE PISTON PUMP

CROSS REFERENCE TO RELATED APPLICATIONS

This application is based on and claims priority under 35 U.S.C. sctn. 119 with respect to Japanese Patent Application No. 2006-29692 filed on Feb. 7, 2006, the entire content of which is incorporated herein by reference.

BACKGROUND OF THE INVENTION

This invention relates to a filter formed of a metal plate mounted e.g. in a hole as a liquid passage for removing any foreign matter in the liquid, a piston pump having a discharge valve including a valve seat member in which the abovementioned filter is mounted, and a method of mounting the filter in the valve seat member of the piston pump.

Among pumps mounted in brake hydraulic pressure controllers as their sources of hydraulic pressure for driving them, piston pumps (also called plunger pumps) are most popular. JP patent publication 2003-528244 discloses such a piston pump.

The piston pump disclosed in this publication includes a discharge valve comprising a valve body and a tubular valve seat member having a bottom and formed with a filter mounting recess (hole) having an opening facing a pump chamber. A filter is mounted in the filter mounting recess so that brake fluid flows through the filter. The filter disclosed in this publication is a molded product which also serves as a spring retainer and includes a cylindrical portion. Thus, this filter has to be formed by drawing, i.e. pressing, which is less productive and thus costly. The filter further includes a flange at one end of the cylindrical portion only and has no such flange at the other end. Thus, the filter can only be pushed into the filter mounting hole with the other end of the cylindrical portion first and not the other way around. This makes it difficult to mechanize the steps of mounting such a filter into the filter mounting recess.

SUMMARY OF THE INVENTION

An object of the present invention is to provide a filter to be mounted in a valve seat member for filtering liquid which can be manufactured without a drawing step, thereby improving productivity and cost performance of a piston pump in which such a filter is mounted, and which can be mounted in the valve seat member with either side thereof first so that the filter can be easily mounted in the valve seat member.

According to the present invention, there is provided a filter for filtering a liquid in the form of a flat metal plate comprising a main body formed with a plurality of filter holes in a central portion thereof, and a plurality of projections integrally and radially outwardly extending from a perimeter of the main body so as to be circumferentially spaced apart from each other.

Preferred forms of the filter are listed below:
(1) The projections are elastically deformable and pressed against the inner surface of a filter mounting hole under an elastic restoring force if bent in the direction of thickness of the main body.
(2) The main body is formed with cuts extending radially inwardly from the perimeter thereof on both circumferential sides of the respective projections.
(3) The width and/or the thickness of the projections is greater than the diameter of the filter holes.
(4) The filter holes and/or the contour of the filter is formed by etching.
(5) The projections and the main body have their respective perimeters formed by etching.

The present invention also provides a piston pump comprising a pump housing defining a cylinder, a piston reciprocatively inserted in the cylinder to define a pump chamber in the cylinder, the pump chamber having a volume that changes with the reciprocating movement of the piston, a discharge valve provided at an outlet of the pump chamber and including a tubular valve seat member having a bottom and defining a filter mounting hole having an opening facing the pump chamber; and a filter for filtering a liquid in the form of a flat metal plate comprising a main body formed with a plurality of filter holes in a central portion thereof, and a plurality of projections integrally and radially outwardly extending from a perimeter of the main body so as to be circumferentially spaced apart from each other, the filter being received in the filter mounting hole with the projections bent toward the opening of the filter mounting hole while in contact with an inner surface of the filter mounting hole, whereby the filter is fixed to the valve seat member by the contact between the projections and the inner surface of the filter mounting hole.

Preferred forms of the piston pump are listed below:
(1) The projections are elastically deformable so as to be pressed against the inner surface of the filter mounting hole under an elastic restoring force.
(2) The filter is received in the filter mounting hole and fixed to the valve seat member with the distal ends of the projections located radially outwardly of the proximal ends thereof.
(3) The filter is configured such that if the filter radially displaces relative to an axis of the filter mounting hole, a portion of the perimeter of the main body where the projections are not provided abuts the inner surface of the filter mounting hole, thereby restricting radial displacement of the filter within a predetermined range.
(4) The filter mounting hole has a first portion near the opening thereof, a second deep end portion remote from the opening, the first portion having a larger diameter than the second deep end portion, and a third tapered portion through which the first portion and the second deep end portion are connected to each other, the filter being received and fixed in position in the second deep end portion.
(5) The bottom of the valve seat member is formed with a valve hole extending therethrough, the valve hole having a large-diameter portion communicating with the filter mounting hole so as to face the filter holes of the filter.

From another aspect of the invention, there is provide a method of mounting the above-described filter in a filter mounting hole formed in a tubular valve seat member of a discharge valve in a piston pump, using a press punch, the filter mounting hole having an opening and a bottom at opposed ends thereof, respectively, the method comprising:

pushing the filter into the filter mounting hole, using the filter mounting hole and the press punch as forming dies to bend the projections toward the opening of the filter mounting hole by pressing tips of the projections against an inner surface of the filter mounting hole, while pushing the main body with a front end portion of the press punch; and bringing the thus bent projections into contact with the inner surface of the filter mounting hole near the bottom thereof, thereby fixing the filter to the valve seat member.

Preferably, the filter mounting hole has a first portion near the opening thereof, a second deep end portion remote from the opening, the first portion having a larger diameter than the second deep end portion, and a third tapered portion through which the first portion and the second deep end portion are connected to each other so that the tips of the projections are brought into sliding contact with the inner surface of the tapered portion while the main body is being pushed in by the press punch, whereby the projections are bent.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1A:
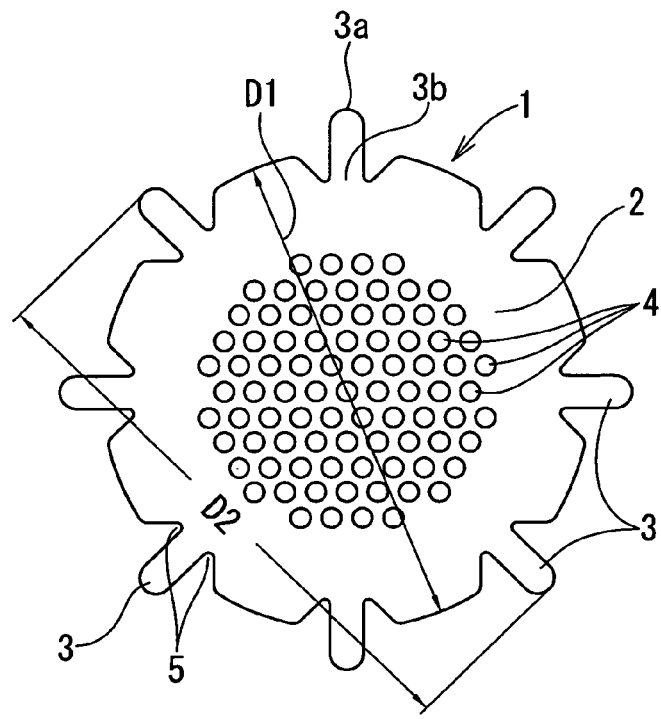
FIG. 1A is a front view of a filter embodying the present invention.
Figure 1B:
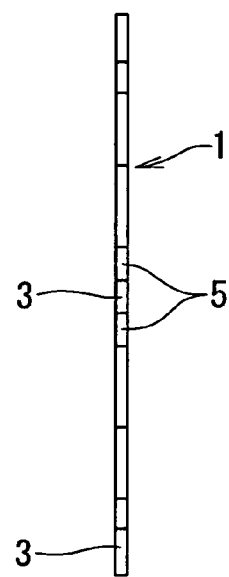
FIG. 1B is a side view of the filter of FIG. 1A.

Now the embodiments of the present invention are described with reference to FIGS. 1 to 5. FIGS. 1A and 1B show a filter embodying the present invention. It is a flat plate-shaped member (see FIG. 1B) made of a corrosion-resistant metal such as stainless steel, and comprising a main body 2 having a basically circular shape, and a plurality of projections 3 radially protruding from the perimeter of the main body 2 and circumferentially spaced apart from each other. Preferably, three or more of such projections 3 are provided at equal pitches. A plurality of filter holes 4 are formed in the central portion of the main body 2. The main body 2 is further formed with cuts 5 radially inwardly extending from its perimeter on both circumferential sides of the respective projections 3.

The projections 3, made of e.g. stainless steel, has elasticity, and can elastically and spontaneously return to their original position after bent in the thickness direction of the main body 2. When the filter 1 is mounted in a filter mounting hole in a valve seat to be described below, the projections 3 are bent and serve as engaging claws (barbs) for fixing the filter in position so as not to come out of the filter mounting hole.

When the filter 1 is mounted in the filter mounting hole, only the projections 3 are bent with the main body 2 not bent. Thus, the filter 1 can be pushed into the filter mounting hole with a minimum pushing force. This prevents strain of the main body 2 when the filter is pushed into the filter mounting hole.

Figure 2:
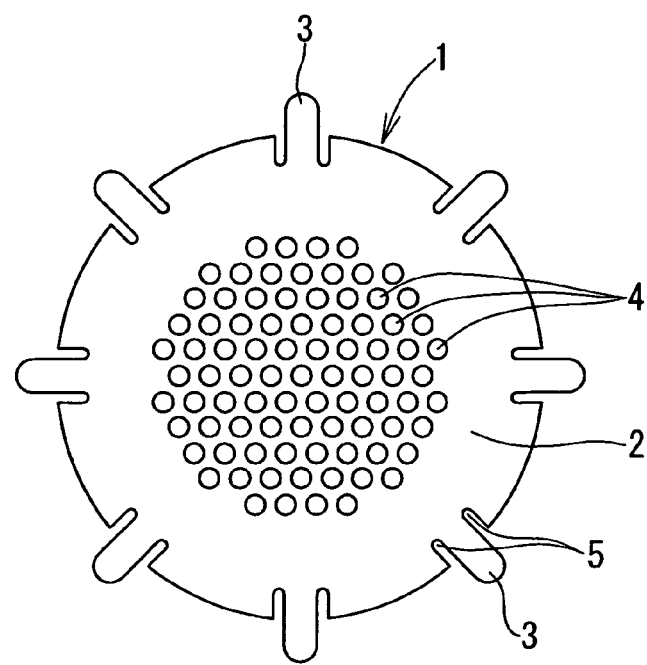
FIG. 2 is a front view of another filter embodying the present invention.

The cuts 5 may be cutouts as shown in FIG. 1A or radial slits as shown in FIG. 2. The cuts 5 are not essential elements in the present invention but are preferable elements because the cuts 5 increase the effective length of the projections 3, thereby making it easier to bend the projections 3 when the filter 1 is inserted into the filter mounting hole.

The projections 3 may have a width and a thickness that are both equal to or smaller than the diameter of the filter holes 4. But preferably, at least one of the width and thickness of the projections 3 is larger than the diameter of the filter holes 4 to prevent any projection 3 of one filter from being inserted into one of the filter holes 4 of another filter when the filters are mounted in filter mounting holes. With this arrangement, it is possible to prevent filters from getting tangled with each other, so that filters can be handled more easily.

The filter holes 4 and the contour of the filter are preferably formed by etching. By etching, the filter holes 4, which are typically very small in diameter, can be formed easily without the possibility of burrs. Thus, it is possible to omit the step of removing burrs, which is necessary if the filter holes are formed by machining.

The filter 1 may be formed by forming a plurality of filter holes in a predetermined area of a blank strip and then blanking the blank strip along the contour of the filter. But preferably, the filter holes and the contour of the filter are simultaneously formed by etching for higher productivity. The projections 3 of the filter 1 according to the present invention are not bent beforehand (i.e. before the filter 1 is mounted in a filter mounting hole), so that the filter 1 can be inserted into a filter mounting hole with either side thereof first. This makes it easier to mechanically mount the filter 1 in a filter mounting hole.

Figure 3:
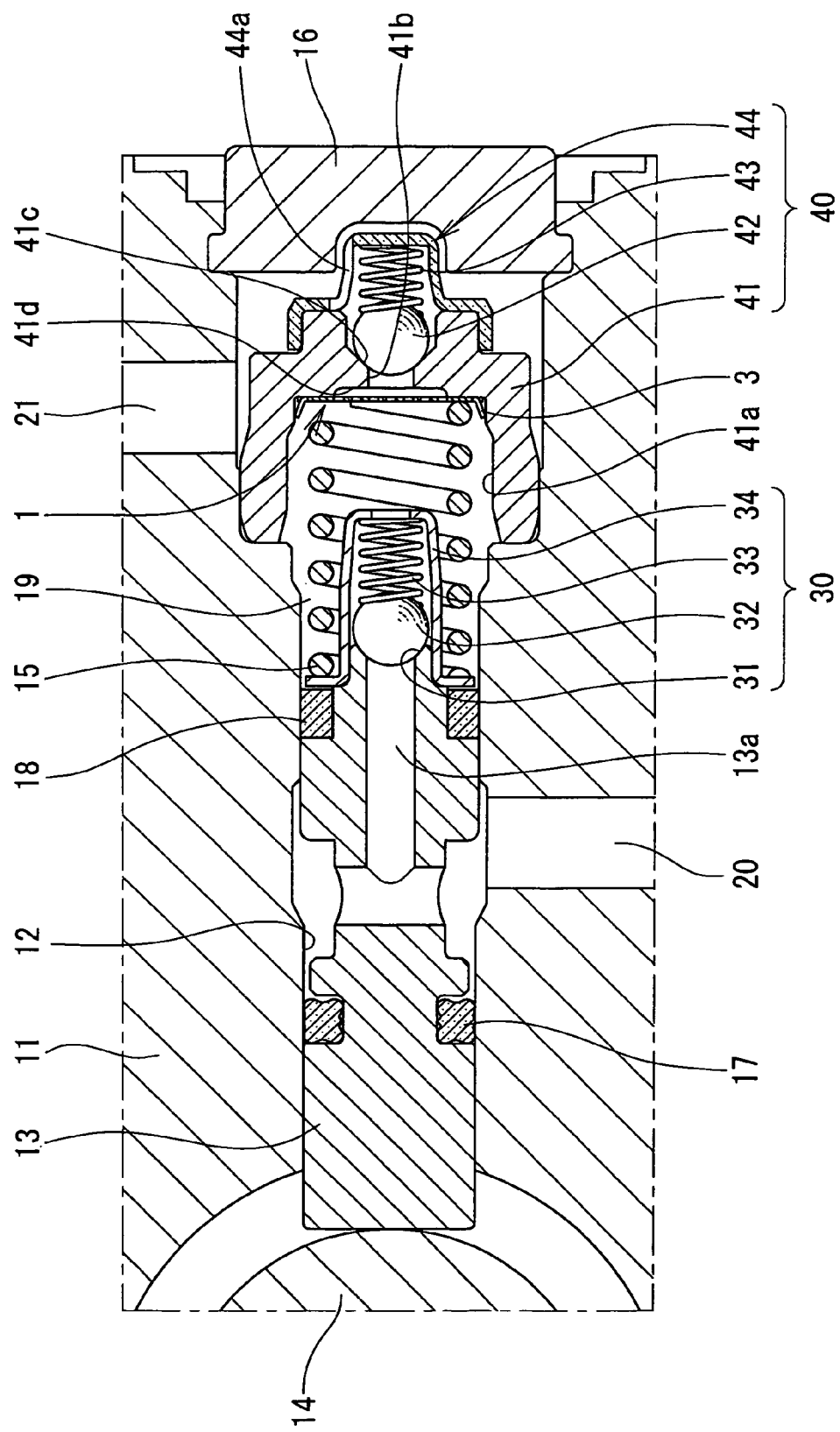
FIG. 3 is a sectional view of a piston pump embodying the present invention.
Figure 4:
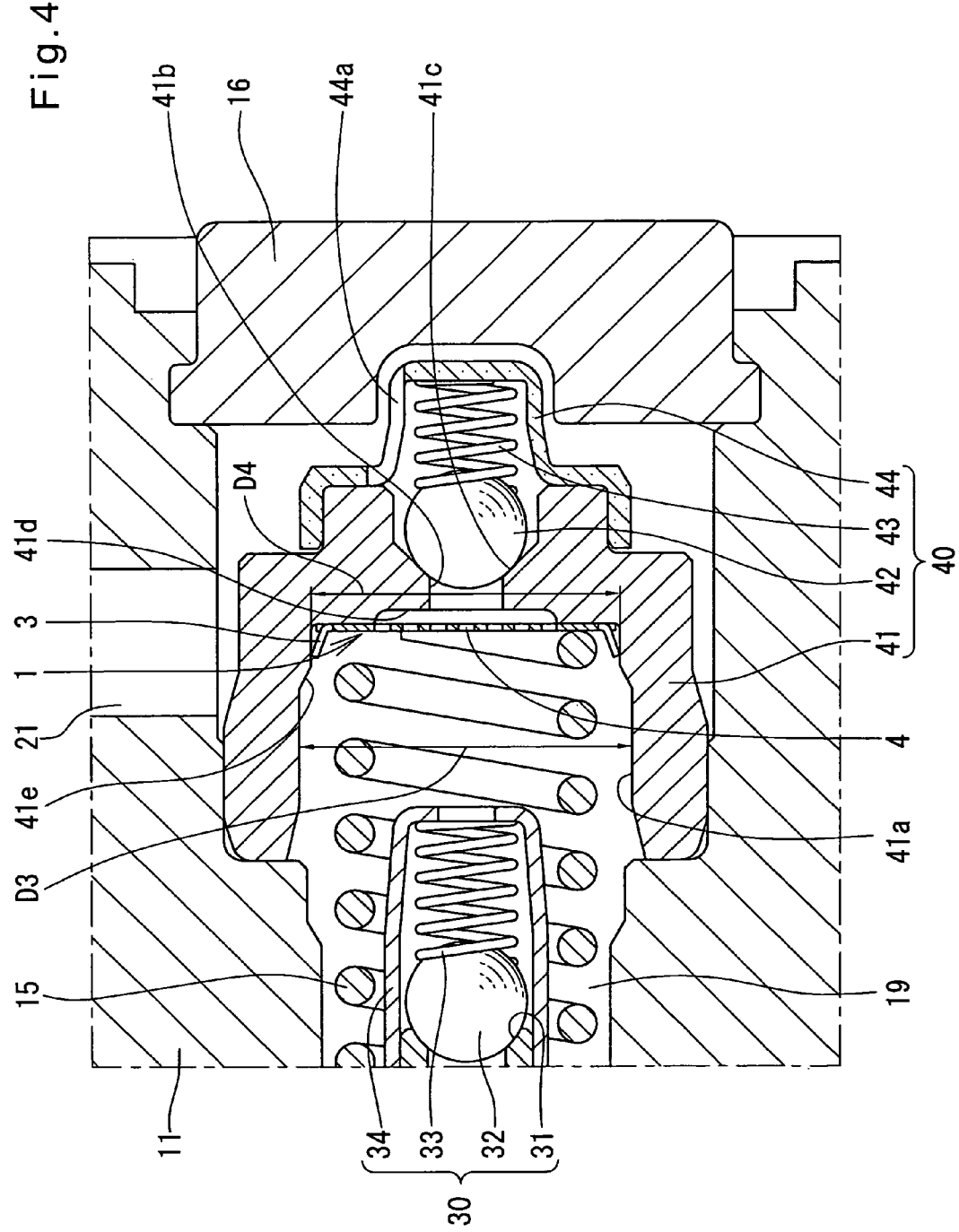
FIG. 4 is a partial enlarged sectional view of the piston pump of FIG. 3.

FIGS. 3 and 4 show a piston pump in which the filter 1 shown in FIGS. 1A and 1B is mounted. The piston pump, which is used in a brake hydraulic pressure controller, comprises a pump housing 11 defining a cylinder 12, a piston 13 inserted in the cylinder 12, an inlet valve 30, a discharge valve 40, a cam 14 for driving the piston 13, a return spring 15 for the piston 13, and the filter 1. The piston pump further includes a plug 16 fixed to the pump housing 11 and closing the opening of the cylinder 12, and seal rings 17 and 18 sealing the outer periphery of the piston 13.

The piston 13 has one end thereof protruding into a pump chamber 19 and is alternately pushed toward the pump chamber 19 by the rotation of the cam 14 and pushed back by the spring 15. By this reciprocating movement of the piston 13, the volume of the pump chamber 19 alternately increases and decrease, so that fluid (brake fluid) is alternately drawn into and discharged from the pump chamber 19.

The inlet valve 30 is mounted at the outlet of a passage 13a formed in the piston 13 and communicating with an inlet passage 20. The inlet valve 30 shown comprises a valve seat 31 formed on the piston 13, a valve body 32 moved into and out of contact with the valve seat 31 to open and close the passage 13a, a coil spring 33 biasing the valve body 32 toward the valve seat 31, and a retainer 34 supporting one end of the coil spring 33. But instead, the inlet passage 20 may directly communicate with the pump chamber 19. In this case, the passage 13a is omitted and the inlet valve 30 is mounted in the inlet passage 20.

The discharge valve 40 is provided at the outlet of the pump chamber 19 (i.e. between the pump chamber 19 and the plug 16). The discharge valve 40 shown comprises a valve seat member 41 liquid-tightly pressed into the cylinder 12, a valve body 42 moved into and out of contact with the valve seat 41c of the valve seat member 41 to open and close the outlet passage, a coil spring 43 having one end thereof in contact with the valve body 42 to bias the valve body 42 toward the valve seat 41c, and a retainer 44 supporting the other end of the coil spring 43. The filter 1 of FIGS. 1A and 1B is mounted in the valve seat member 41 of the discharge valve 40. In this arrangement, brake fluid discharged into the discharge valve 40 flows through a window 44a formed in the retainer 44 and a fluid chamber defined between the plug 16 and the valve seat member 41 into a discharge passage 21. But instead, a passage may be defined between the retainer 44 and the valve seat member 41 through which brake fluid flows from the discharge valve 40 to the discharge passage 21.

The valve seat member 41 is a tubular member having a bottom and defining a filter mounting hole 41a that opens to the pump chamber 19, and a valve hole 41b communicating with the filter mounting hole 41a and having a smaller diameter than the filter mounting hole 41a. The filter 1 is mounted in the filter mounting hole 41a at its deep end. The projections 3 are bent, i.e. elastically deformed, toward the opening of the filter mounting hole 41a when pushed into the hole 41a and kept in this state. Thus, the projections 3 are pressed against the inner surface of the filter mounting hole 41a at the deep end portion thereof under their elastic restoring force. With this arrangement, because the frictional force between the inner surface of the filter mounting hole 41a and the projections 3 is large, the projections 3 (which serve as barbs) positively engage the inner surface of the filter mounting hole 41a, thereby keeping the filter 1 stably fixed to the valve seat member 41.

As shown in FIG. 4, the filter mounting hole 41a of the valve seat member 41 has a diameter D3 near its opening that is greater than its diameter D4 near its deep end. The portions having the diameters D3 and D4 are connected to each other through a tapered portion 41e. With this arrangement, when the projections 3 of the filter 1 abut the tapered portion 41e while the filter 1 is being pushed into the filter mounting hole 41a, the filter 1 is spontaneously guided such that the filter 1 is accurately centered, i.e. aligned with the axis of the hole 41a. That is, when the filter 1 is pushed into the hole 41a, some of the projections 3 may be bent at longitudinally intermediate portions thereof toward the opening of the hole 41a by abutting the edge of the opening of the hole 41a. This causes the filter 1 to be moved to an off-center position relative to the axis of the hole 41a. If the hole 41a had no tapered portion 41e and had a uniform diameter over the entire axial length thereof, the filter 1 tends to remain in the off-center position even after it is completely pushed into the hole 41a. According to the present invention, however, even if the filter 1 is initially in an off-center position, it is moved to an accurately centered position when the projections 3 slide along the tapered portion 41e.

Also, since the projections 3 are bent when their tips 3a are brought into sliding contact with the tapered portion 41e, their moment arms are sufficiently long compared to the situation in which the projections 3 are bent at their longitudinally intermediate portions under external force. Thus, the projections 3 abut the valve seat member with a smaller force, which in turn reduces the possibility of the inner surface of the filter mounting hole 41a being scratched by the projections 3 and thus reduces burrs.

As shown in FIGS. 3 and 4, with the filter 1 mounted in the filter mounting hole 41a, the filter 1 is preferably fixed to the valve seat member 41 with the distal ends 3a (see FIG. 1A) of the projections 3 located radially outwardly of their proximal ends 3b so that the spring 15 can be mounted easily. But instead, the distal ends 3a may be axially aligned with the respective proximal ends 3b or located radially inwardly of the proximal ends 3b.

If the filter 1 is mounted so as to be in contact with the deep end surface of the filter mounting hole 41a, as shown in FIGS. 3 and 4, the valve hole 41b preferably has a large-diameter portion 41d communicating with the filter mounting hole 41a (so as to face the filter holes 4 of the filter 1). Although the large-diameter portion 41d is not an essential element, by providing the large-diameter portion 41d, it is possible to increase the number of filter holes 4 through which brake fluid flows, thus reducing the possibility of clogging of the filter holes 4.

Preferably, the main body 2 of the filter 1 is configured such that if the filter 1 begins to move radially toward an off-center position relative to the axis of the filter mounting hole 41a, its outer edge abuts the inner surface of the filter mounting hole 41a, thereby restricting such movement of the filter 1 within a predetermined range. This allows uniform deformation of the projections 3, thereby minimizing the possibility of inclination and misalignment of the filter 1 when mounted in the hole 41a, which in turn stabilizes the quality of the entire device.

Also, as mentioned earlier and as shown in FIGS. 3 and 4, because the filter 1 has its projections 3 in contact with the inner surface of the filter mounting hole 41a with only the projections 3 bent and the main body 2 not bent, it is possible to minimize the force necessary to push the filter 1 into the filter mounting hole 41a, thus minimizing strain of the main body 2 when the filter 1 is pushed into the hole 41a. This in turn prevents the formation of a gap due to such strain between the filter 1 and the valve seat member 41 that allows passage of foreign matter.

Figure 5A:
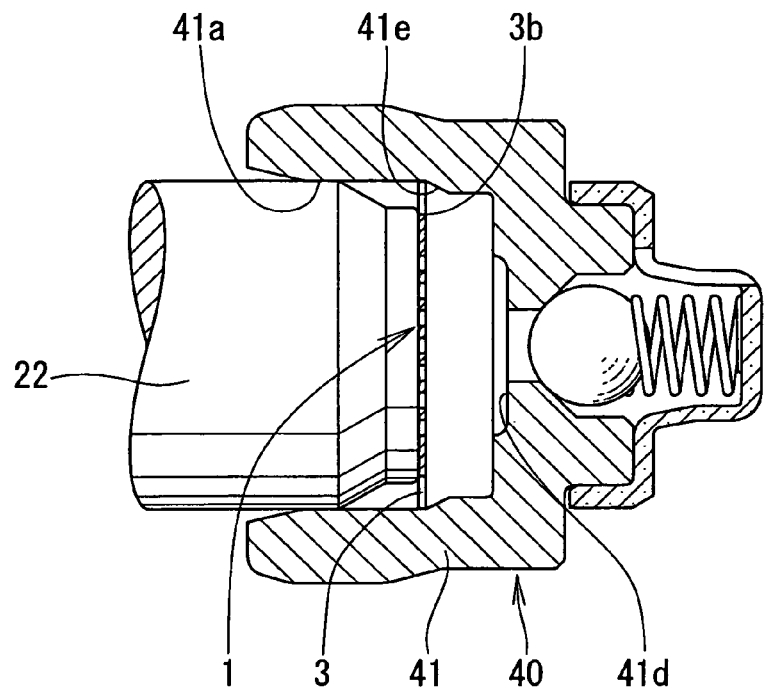
FIG. 5A is a partial sectional view of FIG. 4, showing an intermediate step of the method of mounting the filter according to the present invention.
Figure 5B:
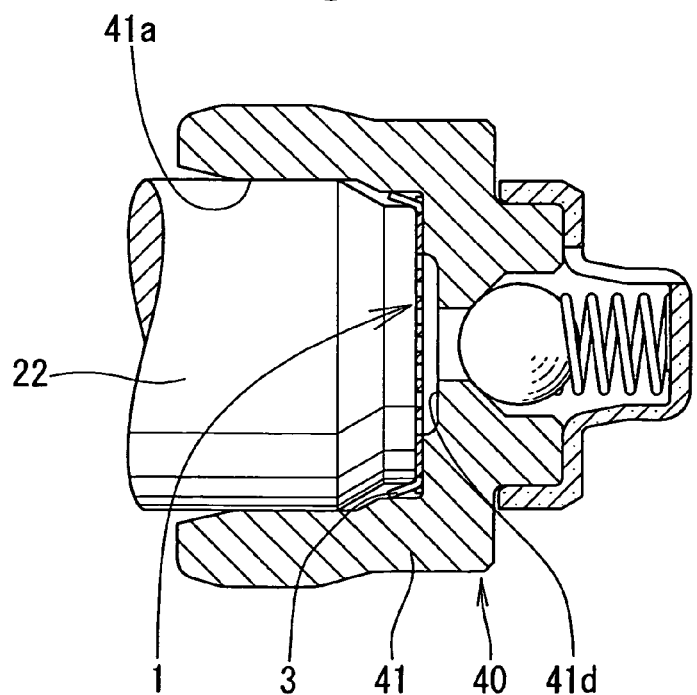
FIG. 5B is a view similar to FIG. 5A and showing the completed state of the method according to the invention.

FIGS. 5A and 5B show a method according to the present invention for pushing the filter 1 shown in FIG. 1 into the filter mounting hole 41a of the valve seat member 41 shown in FIGS. 3 and 4, and fixing it in position in the filter mounting hole 41a.

The filter mounting hole 41a formed in the valve seat member 41 has a shape as described above with reference to FIG. 4. That is, its portion near the opening has a greater diameter than its deep end portion and the former is connected to the latter through the tapered portion 41e. The filter 1 is pushed into this filter mounting hole 41a using a press punch 22. In order that the projections 3 can be bent by the press punch 22 at their portions near the cuts 5, the press punch 22 has a tip diameter that is not smaller than the diameter of the circle that passes the roots of the projections 3 and smaller than the outer diameter D1 of the main body of the filter 1.

The diameter D3 of the filter mounting hole 41a near the opening thereof is greater than the diameter D2 (see FIG. 1) of the circle that passes the tips of the projections 3 (while the projections 3 are not bent). The diameter D4 of the hole 41a at its deep end is greater than the outer diameter D1 of the main body of the filter 1 and smaller than the diameter D2. When the filter 1 is pushed into this filter mounting hole 41a using the press punch 22, the projections 3 come into contact with the inner surface of the tapered portion 41e, so that the filter is guided to the accurately centered position. Simultaneously, the projections 3 are gradually bent toward the opening of the filter mounting hole 41a while kept in sliding contact with the inner surface of the tapered portion 41e. At this time, the front end portion of the press punch 22 serves as a forming die to bend only the projections 3 at their proximal ends 3b or their portions nearer to their distal ends. Thus, the filter 1 can be pushed in with a relatively small pressing force. Also, as stated above, when the projections 3 are bent, the tips 3a of the projections 3 are in sliding contact with the tapered portion 41e with a relatively small contact force. Thus, the projections 3 are less likely to scratch the inner surface of the hole 41a, thus minimizing burrs. The tapered portion 41e is however not an essential element of the present invention, though it is a preferable element for the above-described reasons.

The filter 1 is pushed into the deep end of the filter mounting hole 41a (see FIG. 5B). In this state, the projections 3 generates elastic restoring force due to plastic deformation and elastic deformation thereof while the filter is pushed into the filter mounting hole 41a, and are pressed against the inner surface of the filter mounting hole 41a at its deep end portion under the elastic restoring force. The elastic restoring force increases the frictional force between the projections 3 and the inner surface of the filter mounting hole 41a. The filter 1 is thus stably fixed to the valve seat member 41. Since the projections 3 are bent toward the opening of the filter mounting hole 41a, they act like barbs. Thus, if e.g. a shoulder is formed on the inner surface of the filter so as to be engageable with the projections 3, the filter can be positively fixed in position even if the projections 3 do not generate elastic restoring force (i.e. the projections 3 are bent by plastic deformation). Especially in the case of the piston pump shown in FIGS. 3 and 4, because the filter 1 is pressed against the valve seat member 41 under the force of the spring 15, the elasticity of the projections 3 is useful only in temporarily holding the filter in position relative to the valve seat member 41 until the piston 13 and the spring 15 are mounted, and is not an essential requirement.

The filter according to the present invention, the method of mounting such a filter, and the piston pump including such a filter are applicable to devices other than a brake hydraulic pressure controller. For example, the filter according to the present invention may be mounted in a hole which is a portion of a passage for a liquid other than brake fluid to filter such a liquid.

What is claimed is:

1. A piston pump comprising:
   a pump housing defining a cylinder;
   a piston reciprocatively inserted in said cylinder to define a pump chamber in said cylinder, said pump chamber having a volume that changes with the reciprocating movement of said piston;
   a discharge valve provided at an outlet of said pump chamber and including a tubular valve seat member having a bottom and defining a filter mounting hole having an opening facing said pump chamber; and
   a filter for filtering a liquid in the form of a flat metal plate comprising a main body formed with a plurality of filter holes in a central portion thereof, and a plurality of projections integrally and radially outwardly extending from a perimeter of said main body so as to be circumferentially spaced apart from each other;
   said filter being received in said filter mounting hole with said projections bent toward said opening of said filter mounting hole and in the direction of thickness of said main body, with tips of the projections in contact with an inner surface of said filter mounting hole, whereby said filter is fixed to said valve seat member by the contact between said projections and the inner surface of said filter mounting hole.

2. The piston pump of claim 1 wherein said projections are elastically deformable so as to be pressed against the inner surface of said filter mounting hole under an elastic restoring force.

3. The piston pump of claim 2 wherein said main body is formed with cuts extending radially inwardly from the perimeter thereof on both circumferential sides of said respective projections.

4. The piston pump of claim 2 wherein said projections each have a distal end and a proximal end, and wherein said filter is received in said filter mounting hole and fixed to said valve seat member with said distal ends located radially outwardly of said proximal ends.

5. The piston pump of claim 4 wherein said filter is configured such that if said filter radially displaces relative to an axis of said filter mounting hole, a portion of the perimeter of said main body where said projections are not provided abuts the inner surface of said filter mounting hole, thereby restricting radial displacement of said filter within a predetermined range.

6. The piston pump of claim 5 wherein said filter mounting hole has a first portion near said opening thereof, a second deep end portion remote from said opening, said first portion having a larger diameter than said second deep end portion, and a third tapered portion through which said first portion and said second deep end portion are connected to each other, said filter being received and fixed in position in said second deep end portion.

7. The piston pump of claim 1 wherein said bottom of said valve seat member is formed with a valve hole extending therethrough, said valve hole having a large-diameter portion communicating with said filter mounting hole so as to face said filter holes of said filter.

8. The piston pump of claim 1 wherein said projections have a width and a thickness, and said filter holes have a diameter, at least one of said width and said thickness of said projections being greater than said diameter of said filter holes.

9. The piston pump of claim 8 wherein said filter holes are formed by etching.

10. The piston pump of claim 9 wherein said projections and said main body have their respective perimeters formed by etching.

* * * * *